US011374869B2

(12) United States Patent
Rehman et al.

(10) Patent No.: US 11,374,869 B2
(45) Date of Patent: Jun. 28, 2022

(54) MANAGING BANDWIDTH BASED ON USER BEHAVIOR

(71) Applicant: HEWLETT PACKARD ENTERPRISE DEVELOPMENT LP, Houston, TX (US)

(72) Inventors: Ataur Rehman, Bangalore (IN); Gopal Gupta, Bangalore (IN); Gopal Agarwal, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 242 days.

(21) Appl. No.: 16/371,346

(22) Filed: Apr. 1, 2019

(65) Prior Publication Data

US 2020/0314019 A1    Oct. 1, 2020

(51) Int. Cl.
| H04L 47/2475 | (2022.01) |
| H04L 41/0896 | (2022.01) |
| H04L 67/306 | (2022.01) |
| H04L 47/22 | (2022.01) |
| H04L 43/16 | (2022.01) |
| H04L 47/20 | (2022.01) |
| H04L 43/0894 | (2022.01) |

(52) U.S. Cl.
CPC ...... *H04L 47/2475* (2013.01); *H04L 41/0896* (2013.01); *H04L 43/0894* (2013.01); *H04L 43/16* (2013.01); *H04L 47/20* (2013.01); *H04L 47/22* (2013.01); *H04L 67/306* (2013.01)

(58) Field of Classification Search
None
See application file for complete search history.

(56) References Cited

U.S. PATENT DOCUMENTS

| 8,661,153 B2 | 2/2014 | Ta et al. |
| 9,559,956 B2 | 1/2017 | Raghuraman et al. |

(Continued)

OTHER PUBLICATIONS

Cyberoam—Managing Bandwidth—The User Based Approach, (Research Paper), 2008, Retrieved Jan. 3, 2019, 9 Pgs.

*Primary Examiner* — Saumit Shah
(74) *Attorney, Agent, or Firm* — Nolte Intellectual Property Law Group

(57) ABSTRACT

A method for managing bandwidth may include identifying a first tier of applications and a second tier of applications, determining a number of user sessions associated with at least one application among the first tier of applications and the second tier of applications, each user session consuming a percentage of bandwidth of at least one communication channel in a network, and baselining a second tier application bandwidth use for each user session associated with the second tier of applications to determine a first interval and a second interval. The method may also include calculating a second tier application usage score associated with the second tier of applications, the calculating including determining a percentage of bandwidth used by the second tier of applications in the first interval and determining a percentage of bandwidth used by the second tier of applications in the second interval, generating a user score based on the second tier application usage score and a percentage of use of the first tier of applications, and adjusting a bandwidth allocation based on the user score.

18 Claims, 9 Drawing Sheets

(56) References Cited

U.S. PATENT DOCUMENTS

| | | | |
|---|---|---|---|
| 2001/0039582 A1* | 11/2001 | McKinnon, III | H04L 47/15 |
| | | | 709/226 |
| 2002/0172222 A1 | 11/2002 | Ullmann et al. | |
| 2005/0052992 A1 | 3/2005 | Cloonan et al. | |
| 2010/0268524 A1 | 10/2010 | Nath et al. | |
| 2014/0215061 A1* | 7/2014 | Meng | H04L 41/0896 |
| | | | 709/224 |
| 2020/0092216 A1* | 3/2020 | Lauer | H04L 47/50 |

* cited by examiner

| Timestamp | # critical apps | # non-critical apps | % BW used by non-critical apps | | |
|---|---|---|---|---|---|
| | | | # sessions | Sum of % BW in all sessions | % BW in each session |
| 1539937822 | 23 | 14 | 9 | 1.682 | {0.0695, 0.1194, 0.1372, 0.1136, 0.3158, 0.4943, 0.1237, 0.0410, 0.2673} |
| 1539937827 | 3 | 4 | 8 | 3.177 | {0.3018, 0.0181, 0.9321, 0.5331, 0.1929, 0.0959, 0.8713, 0.2322} |
| 1539937838 | 28 | 9 | 6 | 1.405 | {0.2016, 0.0212, 0.1953, 0.6237, 0.0894, 0.3541} |
| 1539937847 | 8 | 24 | 7 | 8.852 | {0.7596, 2.5530, 0.0941, 3.3880, 1.1659, 0.2055, 0.6866} |
| 1539937860 | 9 | 4 | 8 | 1.515 | {0.2809, 0.0289, 0.0353, 0.1193, 0.8017, 0.0898, 0.2048, 0.0344} |
| 1539937866 | 8 | 16 | 9 | 4.441 | {0.6924, 0.8304, 0.2488, 0.0172, 0.8746, 0.9999, 0.1675, 0.3958, 0.7142} |
| 1539937873 | 17 | 1 | 13 | 1.533 | {0.0227, 0.0057, 0.0269, 0.0673, 0.0127, 0.0333, 0.0727, 0.0543, 0.0357, 0.0827, 0.0237, 0.1685, 0.1075} |

TABLE 1

FIG. 2

| Timestamp | # critical apps | # non-critical apps | %BW used by non-critical apps ||| Score of non-critical apps | User score |
|---|---|---|---|---|---|---|---|
| | | | # sessions | Sum of %BW in all sessions | %BW in each session | | |
| 1539337822 | 8 | 16 | 6 | 0.278 | {0.0209, 0.0272, 0.0592, 0.0571, 0.0472, 0.0670} | 79.35 | 65.54 |
| 1539337827 | 3 | 4 | 8 | 3.177 | {0.3018, 0.0181, 0.9321, 0.5331, 0.1929, 0.0859, 0.8713, 0.2322} | 44.74 | 44.17 |
| 1539337831 | 6 | 30 | 8 | 1.002 | {0.2363, 0.1885, 0.0471, 0.0242, 0.0909, 0.0086, 0.2524, 0.1533} | 83.80 | 63.66 |
| 1539337837 | 20 | 14 | 14 | 0.675 | {0.0221, 0.0866, 0.0242, 0.1693, 0.0528, 0.0259, 0.0049, 0.0584, 0.0535, 0.0408, 0.0511, 0.0066, 0.0057, 0.0635} | 90.16 | 80.76 |
| 1539337873 | 17 | 1 | 13 | 0.716 | {0.0227, 0.0057, 0.0269, 0.0673, 0.0127, 0.0333, 0.0727, 0.0543, 0.0357, 0.0827, 0.0237, 0.1685, 0.1075} | 89.47 | 90.97 |
| 1539337866 | 8 | 16 | 9 | 4.446 | {0.6924, 0.8304, 0.2488, 0.0172, 0.8746, 0.9999, 0.1675, 0.3958, 0.2142} | 30.30 | 31.21 |

TABLE 2

FIG. 5

MANAGING BANDWIDTH BASED ON USER BEHAVIOR

BACKGROUND

Enterprises may use network infrastructure to provide connectivity to users, such as employees and visitors. Users on the network may run various types of applications, with the applications being directed to both business functionality and personal use. Bandwidth over the network may be provisioned to provide preferential treatment to certain types of applications, such as applications that provide business functionality. As such, certain user experiences may be affected based on how bandwidth is provisioned.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

FIG. 2 is a table having sample data for users, according to one or more examples of the disclosure.

FIG. 5 is a table showing a user score for users, according to one or more examples of the disclosure.

DETAILED DESCRIPTION

Figure 1:
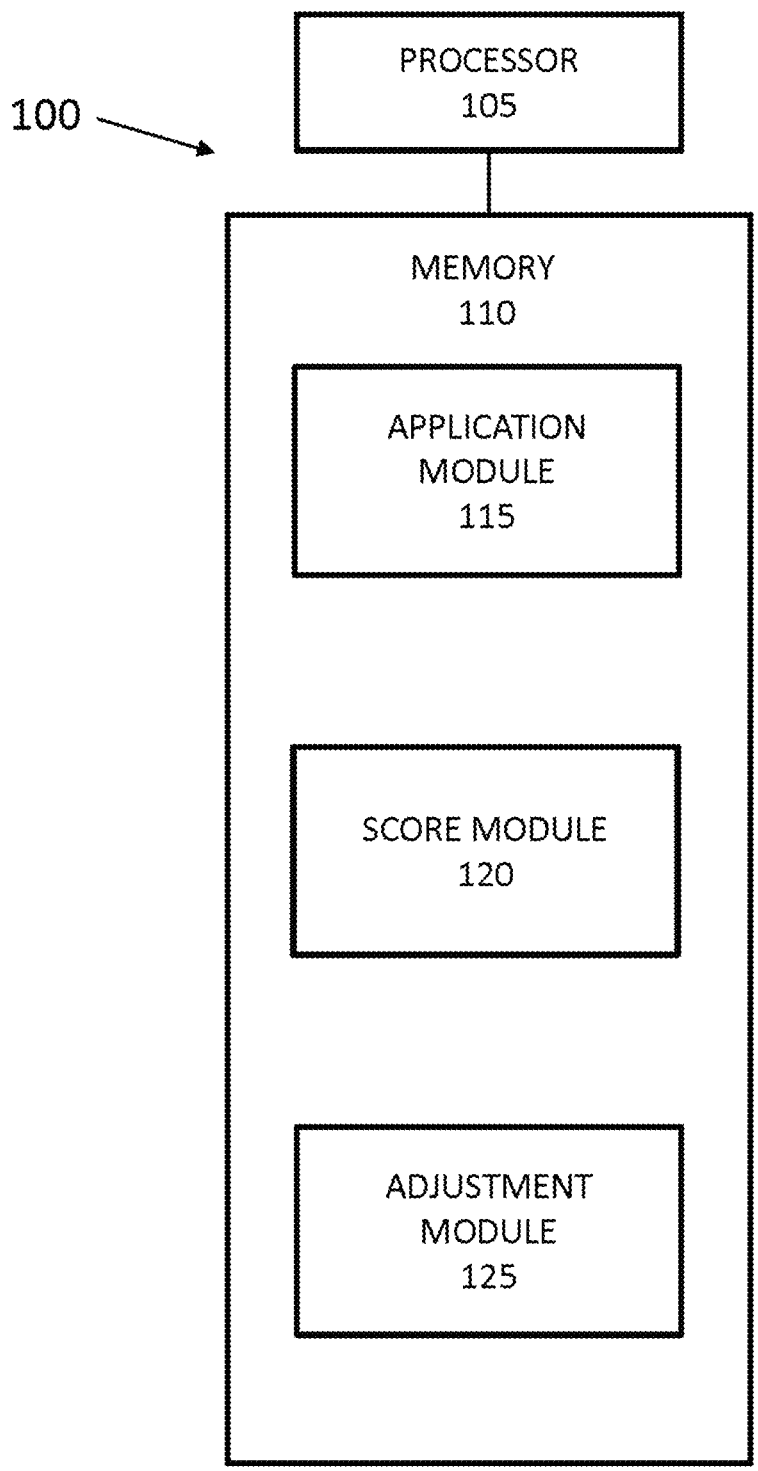
FIG. 1 is a schematic representation of an example computing device for managing bandwidth, according to one or more examples of the disclosure.

Illustrative examples of the subject matter claimed below will now be disclosed. In the interest of clarity, not all features of an actual implementation are described in this specification. It will be appreciated that in the development of any such actual implementation, numerous implementation-specific decisions may be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

Further, as used herein, the article "a" is intended to have its ordinary meaning in the patent arts, namely "one or more," Herein, the term "about" when applied to a value generally means within the tolerance range of the equipment used to produce the value, or in some examples, means plus or minus 10%, or plus or minus 5%, or plus or minus 1%, unless otherwise expressly specified. Further, herein the term "substantially" as used herein means a majority, or almost all, or all, or an amount with a range of about 51% to about 100%, for example. Moreover, examples herein are intended to be illustrative only and are presented for discussion purposes and not by way of limitation.

During deployment of enterprise services, the network may provision application, which are used within the business. Applications that are used for business functionality may include word processing, spreadsheets, presentation software, communication software, and the like. Such applications may be considered first tier, because the applications are used by employees of the business to perform business functions. Other applications may also be used within a business network, such as, for example, shopping applications, games, sports, and the like, and may be referred to as second tier, applications. While these second tier applications may be in use, they may cause network functionality of first tier applications to suffer due to the amount of bandwidth provided to each type of application.

Network resources are limited, and as such, second tier applications may be throttled, or limited. As such, the full utilization of all bandwidth may not be achieved, which may result in poor user experience for those who are using second tier applications. The throttling, or limiting of bandwidth, may occur for second tier applications on a global basis, thereby effecting all users similarly.

Systems and methods disclosed herein may thereby provide the bandwidth of specific users to be adjusted based on individual user application use. As such, the user experience may be improved because bandwidth may be used more efficiently. Additionally, network functionality may be improved by limiting bandwidth to specific users or with respect to certain types of applications, thereby improving the network experience for more than just one set of users.

Turning to FIG. 1, a schematic representation of an example computing device 100 for managing bandwidth according to one or more examples is shown. The computing device 100 may use software, hardware, firmware, or logic to perform functions described herein.

Computing device 100 may include hardware and/or programming instructions configured to share information. The hardware, for example, may include one or more processors 105 (one shown) and memory 110, e.g., computer-readable medium ("CRM"), machine readable medium ("MRM"), database, etc. Processor(s) 105 may include any set of processors capable of executing instructions stored by a memory 110. Processor(s) 105 may be implemented in a single device or distributed across multiple devices. The program instructions, e.g., computer readable instructions ("CRI") may include instructions stored on the memory 110 and executable by the processor(s) 105 to implement a desired function.

Memory 110 may be in communication with processor 105. Memory 110 may include any set of memory components capable of storing instructions that may be executed by processor 105. Memory 110 may be a non-transitory CRM or MRM. Memory 110 may also be integrated in a single device or distributed across multiple devices. Further, memory 110 may be fully or partially integrated in the same apparatus as processor 105 or it may be separate but accessible to that processor 105. Computing device 100 may be implemented on a participant device, on a server device, on a collection of server devices, or a combination of the participant device and the server device.

A set of modules, e.g., an application module 115, a score module 120, and an adjustment module 125, may include CRI that when executed by the processor 105 can perform functions. The set of modules may be sub-modules of other modules. For example, score module 120 and adjustment module 125 may be sub-modules or contained within the same computing device 100. In another example, score module 120 may include additional sub-modules, such as a baseline module. In another example, the set of modules may include individual modules at separate and distinct locations, e.g., CRM, etc.

Application module 115 may allow for the identification of first tier applications, e.g., applications that are used for business, and second tier applications. In order to identify first tier applications and second tier applications, a number of application parameters may be considered. Examples of application parameters that may be used include a user count, a number of bytes, packets, a category, a reputation, a device type, a device address, a network name, and/or a user role.

A user count refers to the number of users using a particular application. The user count associated with the particular application may indicate a priority level associated with the particular application. For example, the more users use the particular application, the more likely the particular application is a first tier application (i.e., high priority application).

A number of bytes refers to the amount of bandwidth an application uses. The number of bytes may correlate to the user count. For example, the greater the amount of bandwidth consumed by a particular application, the more users may be using the particular application.

Packets, as an application parameter, refers a number of packets associated with an application that are being transmitted. The packet parameter may be used to identify the likelihood an application is a first tier application based on determining a number of packets correlated to the number of bytes. Different network traffic patterns contain different sizes of packets. Small sized packets may be control packets, while maximum transmission unit ("MTU") size packets may be data packets. Thus, if the same network traffic is generated by a relatively large number of packets, then the traffic may be more likely to include more control information than data information.

A category may refer to a web category and may thereby provide one or more categories of traffic destinations, e.g., sporting, shopping, business-economic, private IP address, and the like. As such, if the number of bytes is relatively large for an application, but most of the bytes constituting the bandwidth are included in sports and/or shopping, then the application may be more likely to be a second tier application. In contrast, if the number of bytes is relatively large for business related categories, the application may be more likely to be a first tier application.

A reputation may refer to a category of trust for a site and may thereby identify second tier applications as applications where a relatively large number of bytes are consumed by less trusted sites. A device type may refer to a specific type of device, e.g., a cell phone, a tablet, a computing device, a network device, a server, etc., in which a number of bytes for an application is sent. Similarly, a device address may refer to a particular media access control ("MAC") address to which a number of bytes is directed. In either example, a particular device or device address may be identified that is running either a first tier or second tier application, thereby allowing the device or device address to be used in determining what type of application is using bandwidth.

A network name may refer to a service set identifier ("SSID") for a network, such as a wireless local-area network ("WLAN"). Traffic directed to particular network names may be used to identify whether the network is being accessed by a first or second tier application. A user role may allow users to be identified and may thus allow for bandwidth adjustments based on the actions of a particular user with respect to the users use of first and/or second tier applications.

In certain implementations, one or more application parameters may be used. For example, in one implementation, a single application parameter may be used to identify first and second tier applications, while in other implementations, two or more application parameters may be used.

In one implementation, in order to identify first tier and second tier applications, feature selection may be performed. Feature selection may refer to gathering application traffic data. The application traffic data may include one or more of the application parameters, for each application. After the application traffic data is collected, thereby providing a database of data representative of different types of use on a network, preprocessing of the data may occur. Preprocessing may refer to assigning a relative weight to each application parameter, such that certain application parameters may have a higher value relative to an application being either a first tier or a second tier application.

After weights are assigned to the application parameters, parameter transformation may occur, thereby resulting in a homogeneous type of data, e.g., all data may be converted into numerical values. As such, application parameters that do not exclusively result in numerical representations, e.g., a user role, a category, a reputation, and the like, may be compared with application parameters that may return a numerical value, i.e., a number of bytes or packets. Once the data is represented in a common form, the data may be divided into a training set for validation. A classification model may then be built with the training set and model accuracy subsequently validated.

After preprocessing, first and second tier applications may be identified using techniques including, for example, machine learning algorithms. To classify applications as either first tier or second tier, application parameters specific to particular types of applications may be identified. The list of applications may be compared with the use data, and a model may be trained in order to classify applications as either first tier or second tier. Such models may be created using, for example, support vector machines ("SVM") having logistic kernels.

The created models may then be used to analyze use data at specific intervals to periodically identify lists of first tier applications. For example, in certain implementations, use data may be analyzed weekly, while in other implementations, use data may be analyzed monthly. Depending on the environment in which applications are used, the use data may be analyzed in other intervals.

After the first tier applications are identified, user scores may be generated based on a percentage of first tier application use and a percentage of bandwidth used by second tier applications. In order to generate the user scores, the use data is processed and/or provided in its original form to score module 120. While specific examples are provided below, initially, a general explanation of generating user scores is provided.

The user score may be a weighted combination of the percentage of first tier application use and the score of bandwidth used by second tier applications. The weighting may vary according to specific implementations. Examples of weighting may include having a weight multiplier that increases a user score for the percentage of bandwidth used by second tier applications. For example, in one implementation, the percentage of first tier application use may be multiplied by 0.3, while the score of bandwidth used by second tier applications may be multiplied by 0.7. As such, the more bandwidth that is used by second tier applications, the higher a user score may be assigned for a particular user.

To compute the user score of bandwidth used by second tier applications, a range of percentage of use of bandwidth by all of a user's second tier applications within a session may be determined. The range may be determined by using a baselining algorithm to take all of a user's second tier application session bandwidth percent use as an input and provide a learned range as an output. Learned ranges may fall into two or three intervals, where the smallest range is considered good and the largest range is considered poor. In a three interval range, a middle range may be considered fair. Good refers to a relatively low amount of bandwidth being used by second tier applications, while poor refers to a relatively high amount of bandwidth being used by second tier applications.

To determine a score of bandwidth used by second tier applications, the following formula may be followed:

$$X^{1+\alpha}+\beta*Y+Z=\text{Score of bandwidth used by second tier applications}$$

Where,

X=percentage values in a first interval (good interval)
Y=percentage values in a second interval (fair interval)
Z=percentage values in a third interval (poor interval)
α=X modifier, varies between [0, 1], with a default of 0.5
β=Y modifier, varies between [1, 50], with a default of 7.5

In order to avoid an exception due to division by zero, the denominator in the calculation of X, Y, and Z is increased by one. As such, X equals 100 times the number of sessions falling in a first interval, divided by the sum of the total number of sessions plus 1. This is repeated to calculate Y and Z, using the intervals associated therewith.

By using this formula, a score of bandwidth used by second tier applications may be determined, which may thereafter allow a user score to be computed. In this example, α is an X modifier that allows a certain weight to be applied to session bandwidth for second tier applications. As such, the greater the value of α, the more weight is applied to second tier application bandwidth falling within the first interval. Similarly, β is a Y modifier, that allows a certain weight to be applied to session bandwidth for second tier applications. As such, the greater the value of β, the more weight is applied to second tier application bandwidth falling within the second interval.

In addition to the score of bandwidth used by second tier applications, to determine the user score, the percentage of first tier applications may be determined by dividing the number of first tier applications of the user by the number of first tier applications of the user added to the number of second tier applications of the user. The user score may then be determined by weighting one or more of the percentage of first tier applications of the user and/or the score of bandwidth used by second tier applications of the user. The weighted percentage of first tier applications of the user and the score of bandwidth used by second tier applications of the user may then be added together to generate the user score.

In certain implementations, the user score may be adjusted to provide a score within a particular range. For example, the user score may be adjusted to provide a score between 0 and 100, where the closer to 100 indicates that the user is either using first tier applications compared to second tier applications in a bandwidth efficient manner or, little to no second tier applications may be in use. In contrast, a lower score may represent a large amount of bandwidth is being consumed relative to use of first tier applications.

The user score may then be used to determine whether to rate limit bandwidth for a particular user. For example, in certain implementations, user scores may be defined in particular ranges. In one example, a four-range categorization may occur where a user score of 70-100 results in no rate limiting of bandwidth, while a user score of 50-70 may result in rate limiting the total second tier application bandwidth by 70 percent. The rate limiting may occur by providing a blanket rate limit for each second tier application session by 70 percent of bandwidth consumption.

Another range may include a user score between 30 and 50, which may result in bandwidth rate limiting to 50 percent of bandwidth consumption. Similarly, another range may include a user score below 30, which may then result in bandwidth rate limiting to 30 percent of bandwidth consumption. The ranges provided above are examples ranges, and as such, other ranges may also be used. In operation, fewer than four range intervals may be provided and/or the range intervals may be defined by other percentages.

The process of user score calculation and rate limiting may be reiterated after a defined time period. For example, the user score calculation and rate limiting may be reiterated every five minutes, or for another period as may facilitate application use at a particular location. Additionally, after a bandwidth contract for a user is applied, the user score in each subsequent reiteration may improve due to less bandwidth being used by second tier applications. As such, after a number of reiterations, the user score may be high enough that no rate limiting may be applied.

To implement the rate limiting, thereby adjusting the bandwidth contract for a particular user, adjustment module 125 may issue a bandwidth contract commensurate with the user score, as explained above. Adjustment module 125 may be a standalone module or may be a sub-module of one or more of application module 115 and/or score module 120. Accordingly, bandwidth contracts for users may be dynamically adjusted based on use of first tier applications and the bandwidth used by second tier applications.

By targeting bandwidth rate limiting to users that have a disproportionately high percentage of bandwidth consumption for second tier applications, bandwidth may be more effectively provided to each user in a network. In order to explain the user score calculation in greater detail, an example is provided below with respect to FIGS. 2-4.

Turning to FIG. 2, a table having sample data for users according to one or more examples is shown. Table 1 includes sample data for a number of users. Each user is identified by a particular timestamp, e.g., 1539337827, which is representative of a time period over which applications may be used. For example, in one implementation, the timestamp may be representative of application use by a user for a 30-minute time period. The time period may vary according to operational requirements.

Table 1 further includes a number of first tier applications, and a number of second tier applications. The percentage of bandwidth used by second tier applications is also identified and broken down into a number of sessions, a percentage bandwidth in each session, and a sum of a percentage of bandwidth in all sessions. For example, a user having timestamp 1539337827 may be running 3 first tier applications and 4 second tier applications. The application use may occur over 8 sessions, where the bandwidth use in each session is {0.3018, 0.0181, 0.9321, 0.5331, 0.1929, 0.0959, 0.8713, 0.2322}. The sum of a percentage of bandwidth in all sessions may thereby be 3.177.

The percentage of bandwidth in each session of Table 1 may be baselined. A baseline generally refers to a method that uses heuristics, simple summary statistics, randomness, and/or machine learning to create predictions for a dataset. These predictions can be used to measure the baseline's performance (e.g., accuracy), which then can be used to compare against other machine learning mechanisms. Example baselines used may include, but are not limited to, classification baselines, regression baselines, etc.

Figure 3:
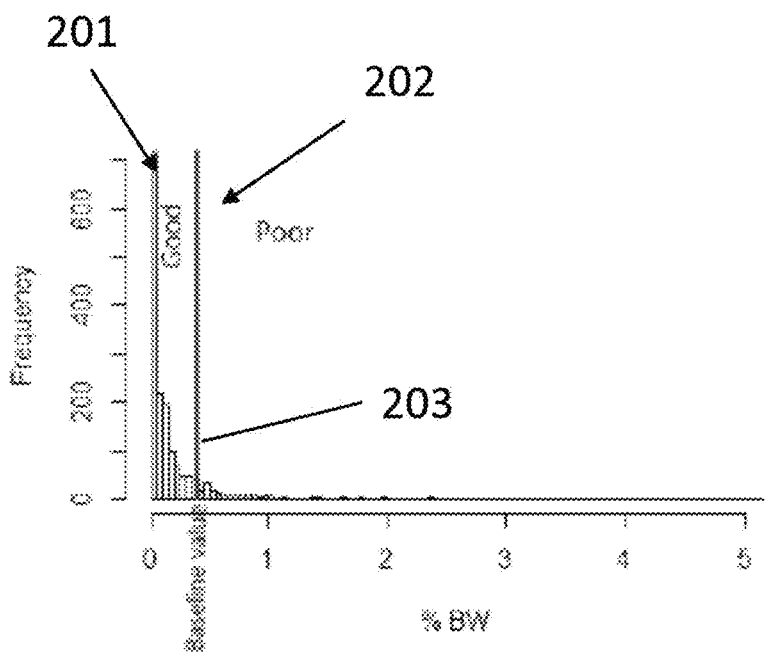
FIG. 3 is a graph showing learned baseline values for the sample data from the table in FIG. 2, according to one or more examples of the disclosure.

After baselining the percentage of bandwidth in each session, a first interval and a second interval may be produced. Turning briefly to FIG. 3, a graph showing learned baseline values for the sample data from the table in FIG. 2, according to one or more examples is shown. As illustrated, the baselined data results in a first interval 201 and a second interval 202. As only two intervals are produced, first interval 201 may be referred to as a good interval, while second interval 202 may be referred to as a poor interval. The baseline value 203 produced in this example is 0.395. As such, first interval 201 may be bound by a percentage bandwidth between 0 and 0.395, while second interval 202 may be bound by a percentage bandwidth between 0.395 and 5.

Figure 4:
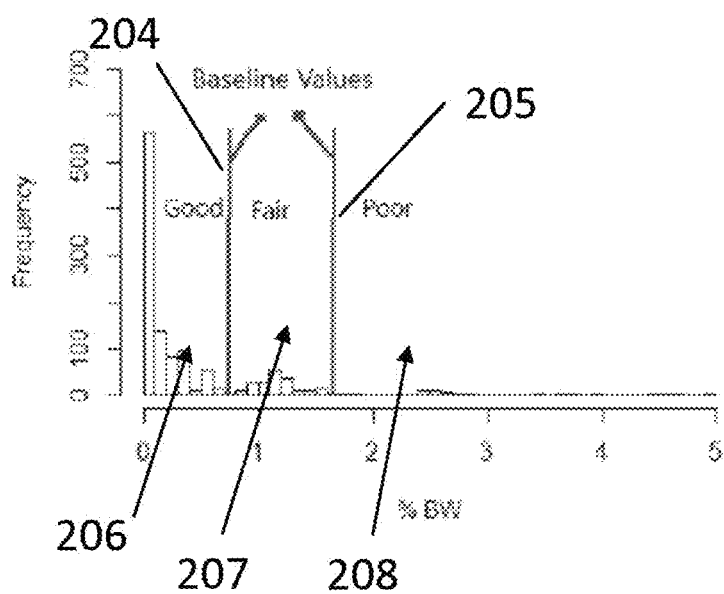
FIG. 4 is a graph showing learned baseline values, according to one or more examples of the disclosure.

Turning briefly to FIG. 4, a graph showing learned baseline values according to one or more examples is shown. In other implementations, baselining may result in two baseline values, 204 and 205, respectively, thereby producing a first interval 206, a second interval 207, and a third interval 208. As such, first interval 206 may be a good interval, second interval 207 may be a fair interval, and third interval 208 may be a poor interval. In either implementation, baselining may result in a division of percentage of bandwidth into two or more intervals, thereby allowing a percentage bandwidth per session use by second tier applications to be analyzed to determine which percentage of session bandwidth falls within a particular interval.

Turning to FIG. 5, a table showing a user score for users according to one or more examples is shown. Continuing the example above, Table 2 shows similar information as provided in Table 1, however, Table 2 also provides a score of second tier applications, and a user score. The score of second tier applications refers to the score of bandwidth used by second tier applications, as discussed in detail above. To further illustrate computation of the score, the example of timestamp 1539337827 is continued below.

To determine the score of bandwidth used by second tier applications, the percentage of session bandwidth falling within the first interval, good interval, and the percentage of bandwidth falling within the second interval, poor interval, may be calculated. In this example, baselining only returned two intervals, so the percentage of bandwidth falling in a fair interval is not calculated. The baseline intervals include a first interval for session bandwidth falling between 0 and 0.395, i.e., the good interval, and a second interval falling between 0.395 and 5, i.e., the poor interval.

To calculate the score of bandwidth used by second tier applications, the formula provided above is applied, and the calculation of X and Z is performed to determine the percentage of session bandwidth falling in the good interval and the percentage of bandwidth falling the in poor interval. In this example, sessions 0.3018, 0.0181, 0.1929, 0.0959, and 0.2322 fall within the good interval, thereby bringing the total to 5. Sessions 0.9321, 0.5331, and 0.8713 fall within the poor interval, thereby bringing the total to 3. The total number of sessions is 8, but as explained above 1 is added to the denominator, so the expression of the total number of sessions plus 1 is 9. To calculate X and Z, respectively, the following calculations are followed:

$X = 100 \times (5/(8+1))$ $Z = 100 \times (3/(8+1))$

As such, X is 55.5 and Z is 33.3.

To determine the score of bandwidth used by second tier applications, the previously provided formula is applied, and the following calculation is performed:

score of bandwidth used by second tier applications $= 55.5^{1.5} + 7.5(0/1) + 33.3$ In this example, $\alpha$ is 0.5 and $\beta$ is 7.5. As such, the score of bandwidth used by second tier applications is 447.4, which may be divided by 10 to produce a final score of 44.74.

To calculate the user score, the percentage of first tier applications may be calculated as the number of first tier applications multiplied by 100, the total is then divided by the total number of first tier applications and second tier applications, which results in:

percentage of first tier applications $= (100 \times 3)/(3+4)$

Accordingly, the percentage of first tier applications is 42.85. To determine the user score, a weighted percentage may be applied to one or more of the percentage of first tier applications and/or the score of bandwidth used by second tier applications.

In this example, the weight factors may include 0.3 for the percentage of first tier applications and 0.7 of the score of bandwidth used by second tier applications, thereby providing the following calculation:

user score $= 0.3 \times 42.85 + 0.7 \times 44.74$

As such, the calculated user score is 44.17.

The user score may subsequently be used to adjust bandwidth for the particular user. Following the ranges above, the user score of 44.17 may result in a bandwidth limitation of 50 percent, which may occur by rate limiting each secondary application session by 50 percent of current bandwidth consumption. Depending on operational requirements, the rate limiting may include adjusting bandwidth by different amounts. For example, in other implementations, the bandwidth may be rate limited on a linear scale that corresponds to the user score. In such a circumstance, the bandwidth may be rate limited by 44.17 in the current example. The process of user score calculation and bandwidth adjustment may occur periodically, such as every five minutes, thereby increase efficiency of bandwidth usage for one or more users.

Figure 6:
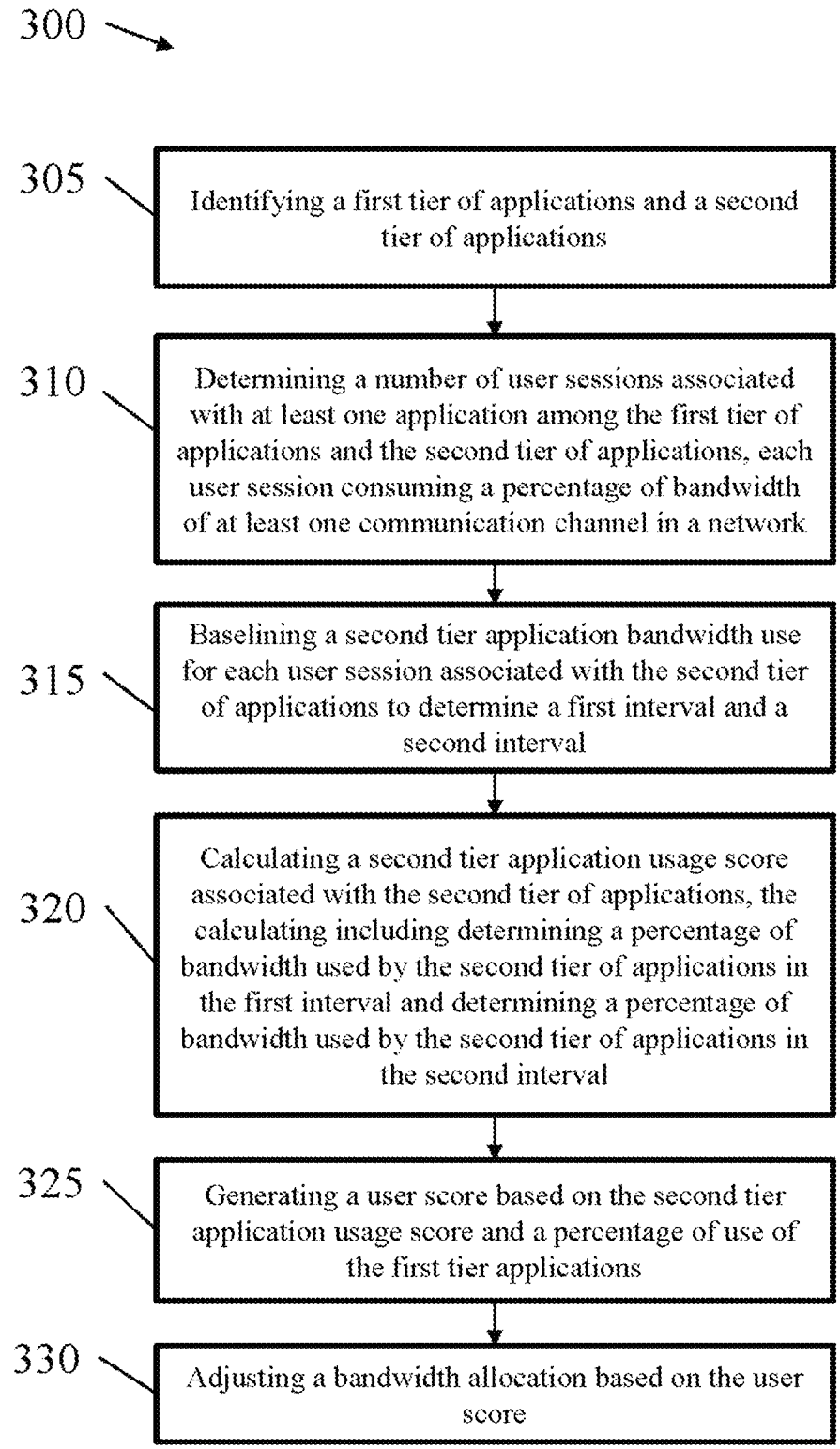
FIG. 6 is a flowchart depicting a method for managing bandwidth, according to one or more examples of the disclosure.

Turning to FIG. 6, a flowchart depicting a method 300 for managing bandwidth according to one or more examples is shown. In operation, method 300 may include identifying (block 305) a first tier of applications and a second tier of applications. The first tier of applications may include applications that are used in business, e.g., word processing, spreadsheets, presentation software, communication software, financial software, and the like. The second tier applications may include other types of applications, such as mapping software, games, sports, etc. The identification may occur, as described above, by generating a model that identifies the first and second tier applications based on a set of application parameters that define features of application use. The application parameters may thus be applied through machine learning algorithms to determine, based on use data, whether the use is for first tier or second tier applications. The process of identifying may be repeated within a certain time period in order to account for changes in user behavior, new applications, new application types, and the like.

In operation, method 300 may include determining (block 310) a number of user sessions associated with at least one application among the first tier of applications and the second tier of applications, each user session consuming a percentage of bandwidth of at least one communication channel in a network. Determining the number of user sessions may refer to collecting user data over a specific time interval, which may be identified by a timestamp. The timestamp, or interval of sessions, may include a definitive time period, such as 30 minutes. In such an example, every 30 minutes the number of sessions in which applications were used may be determined. For each session, the percentage of bandwidth may also be collected, thereby providing a percentage bandwidth use for each session within a time period. With this information, the sum of the percentage of bandwidth for all sessions in the time period may also be determined.

In operation, method 300 may include baselining (block 315) a second tier application bandwidth use for each user session associated with the second tier of applications to determine a first interval and a second interval. The baselining may include determining, for the second tier applications, intervals, or ranges, which are defined as being good, fair, or poor. The baselining may thereby allow sessions of good use to be determinable from session that were not a good use of bandwidth. In certain implementations there may be a first and second interval, while in other implementations there may be a first, second, and third interval. The intervals may be associated with the calculations, as explained in detail above.

In operation, method 300 may include calculating (block 320) a second tier application usage score associated with the second tier of applications, the calculating including determining a percentage of bandwidth used by second tier applications in the first interval and determining a percentage of bandwidth used by second tier of applications in the second interval. This calculation may thereby provide a weighted determination of the percentage of bandwidth use that is occurring in each session for second tier applications.

In operation, method 300 may include generating (block 325) a user score based on the second tier application usage score and a percentage of use of the first tier applications. As explained above, the user score may use weighting in order to provide a score that allows for a determination of whether a user should be rate limited. The rate limiting determination may occur as a result of the user score falling within a predefined range, where the location within the range defines how much a user is rate limited, if any rate limiting occurs at all. In certain implementations, a range may be defined that does not result in rate limiting.

In operation, method 300 may include adjusting (block 330) a bandwidth allocation based on the user score. The bandwidth of a particular user may be adjusted to account for the user's behavior through use of first tier and second tier applications. As such, the bandwidth may be adjusted to allow more bandwidth for first tier applications, while decreasing bandwidth for second tier applications. Additionally, as individual users may be rate limited, the efficiency of an operation may be increased by providing more bandwidth for first tier applications, while providing less bandwidth for second tier applications.

Figure 7:
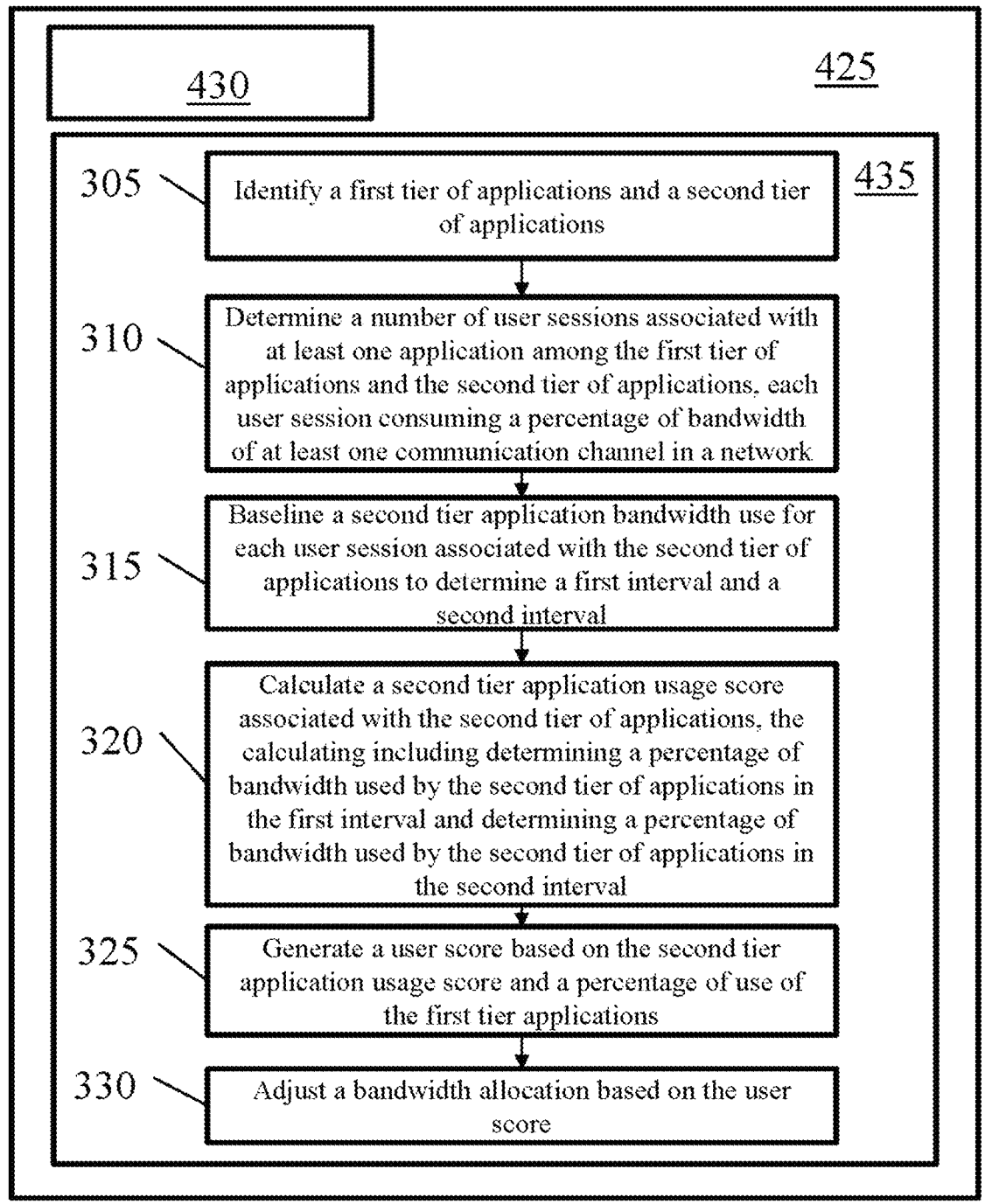
FIG. 7 is an example computing device with a hardware processor and accessible machine-readable instructions, according to one or more examples of the disclosure.

Turning to FIG. 7, an example computing device with a hardware processor and accessible machine-readable instructions, according to one or more examples is shown. FIG. 7 provides an example computing device 425, with a hardware processor 430, and accessible machine-readable instructions stored on a machine-readable medium 435 for generating information about a product as discussed above with respect to one or more disclosed example implementations. FIG. 7 illustrates computing device 425 configured to perform the flow described in blocks 305, 310, 315, 320, 325, and 330 discussed in detail with respect to FIG. 6. However, computing device 425 may, also be configured to perform the flow of other methods, techniques, functions, or processes described in this disclosure.

A machine-readable storage medium, such as 435 of FIG. 7, may include both volatile and nonvolatile, removable and non-removable media, and may be any electronic, magnetic, optical, or other physical storage device that contains or stores executable instructions, data structures, program module, or other data accessible to a processor, for example firmware, erasable programmable read-only memory ("EPROM"), random access memory ("RAM"), non-volatile random access memory ("NVRAM"), optical disk, solid state drive ("SSD"), flash memory chips, and the like. The machine-readable storage medium may be a non-transitory storage medium, where the term "non-transitory" does not encompass transitory propagating signals.

Figure 8:
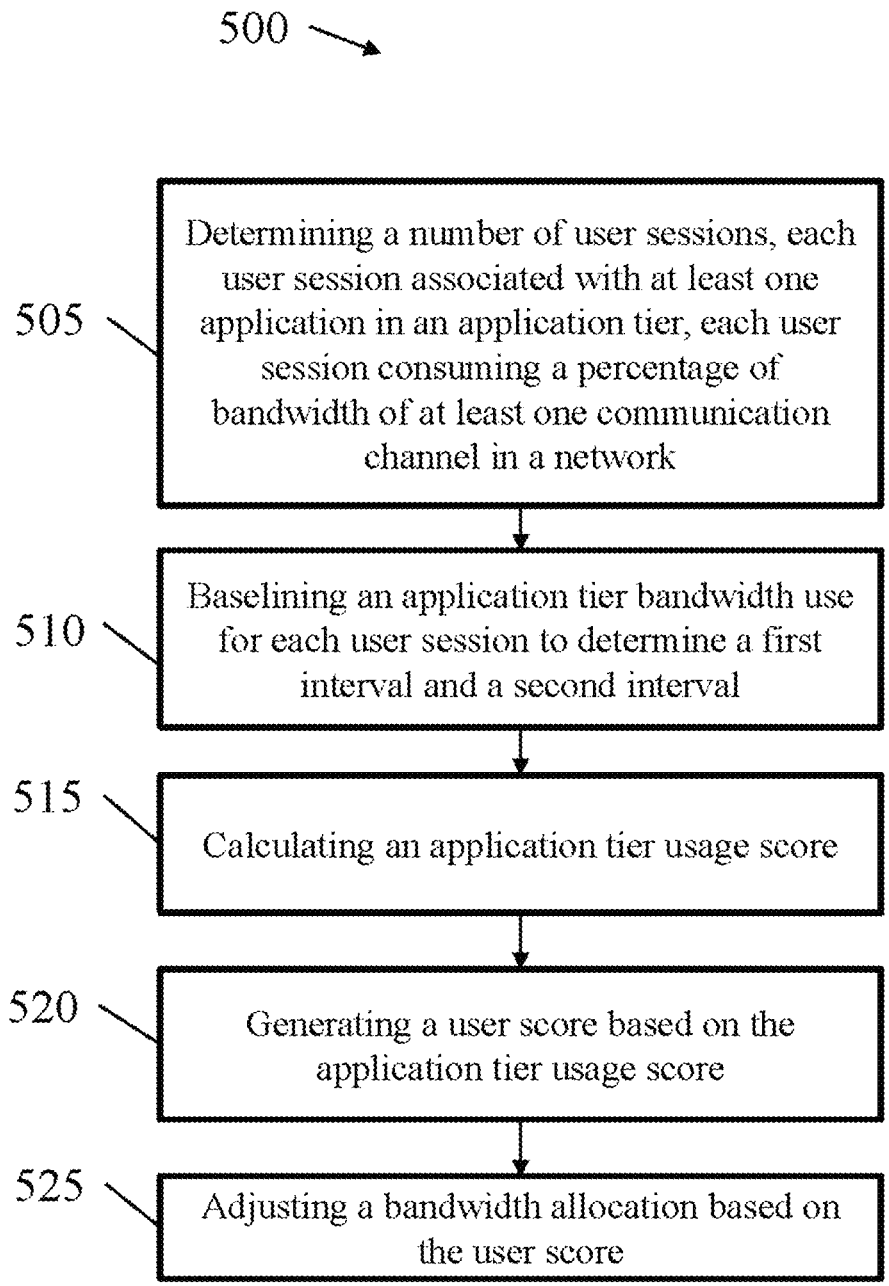
FIG. 8 is a flowchart depicting a method for managing bandwidth, according to one or more examples of the disclosure.

Turning to FIG. 8, a flowchart depicting a method 500 for managing bandwidth according to one or more examples is shown. In operation, method 500 may include determining (block 505) a number of user sessions, each user session associated with at least one application in an application tier, each user session consuming a percentage of bandwidth of at least one communication channel in a network. The application tier may refer to, for example, application in the first tier or applications in the second tier, as discussed in detail above. In operation, method 500 may include baselining (block 510) an application tier bandwidth use for each user session to determine a first interval and a second interval. The application tier bandwidth use may refer to, for example, applications within the second application tier, as explained above with respect to FIG. 6. As such, the application tier may include applications that are not related to business, such as shopping applications, sports applications, entertainment applications, and the like.

In operation, method 500 may include calculating (block 515) an application tier usage score. In one implementation, the application tier usage score may refer to, for example, the second tier application usage score, as discussed above. The application tier usage score may include a score that defines the bandwidth used by applications, and may follow the formula, or a variation of the formula, provided above. In other implementations, certain variables may have different values and/or ranges. For example, in certain implementations, an α value may not be used to determine an application tier usage score, while in other implementations a β value may not be used. In still other implementations, scores may only be calculated to include certain baselined intervals. In yet other implementations, additional values may be included to further provide for weighting certain values. For example, Z may also include a modifier that may be used to increase or decrease the weight of the Z interval.

In operation, method 500 may include generating (block 520) a user score based on the application tier usage score. Additionally, in operation, method 500 may include adjusting (block 525) a bandwidth allocation based on the user score. The adjustments may include any adjustments provided above including, for example, rate limiting bandwidth for a user, rate limiting bandwidth for a specific user session, rate limiting bandwidth for the use of second tier applications, etc.

In certain implementations, method 500 may further include identifying the application tier and a second application tier. In such an implementation, the application tier may refer to applications that are not related to business operations while the second application tier may refer to applications that are related to business operations. As such, generating the user score may be based on the application tier usage score and the percentage of use of applications in the second application tier.

Figure 9:
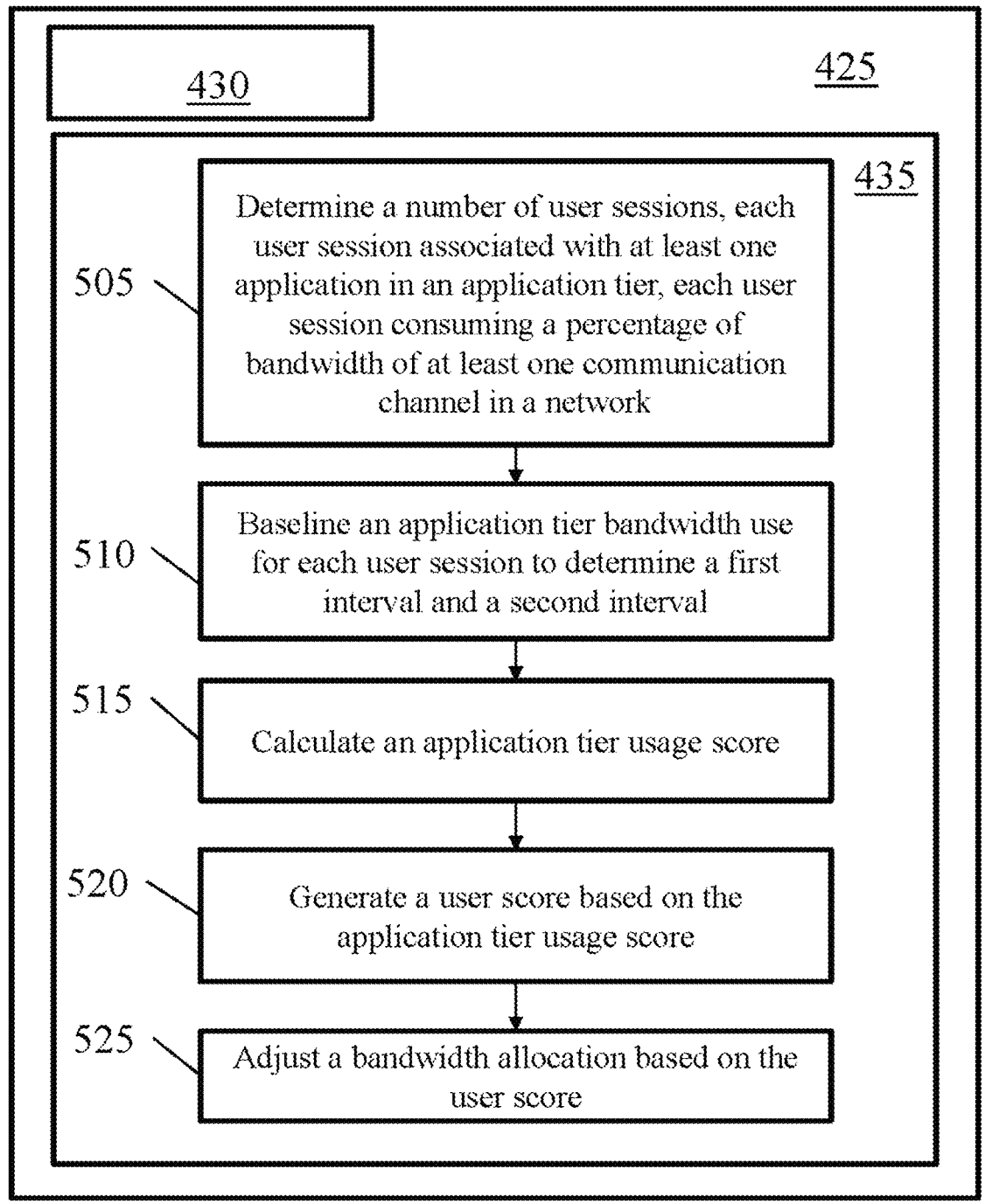
FIG. 9 is an example computing device with a hardware processor and accessible machine-readable instructions, according to one or more examples of the disclosure.

Turning to FIG. 9, an example computing device with a hardware processor and accessible machine-readable instructions, according to one or more examples is shown. FIG. 9 provides similar structural components discussed above with respect to FIG. 7, and as such, for purposes of clarity, only the differences in the figures will be discussed herein, FIG. 9 provides an example computing device 425, with a hardware processor 430, and accessible machine-readable instructions stored on a machine-readable medium 435 for managing data as discussed above with respect to one or more disclosed example implementations. FIG. 9 illustrates computing device 425 configured to perform the flow described in blocks 505, 510, 515, 520, and 525, discussed in detail with respect to FIG. 8.

Figure 10:
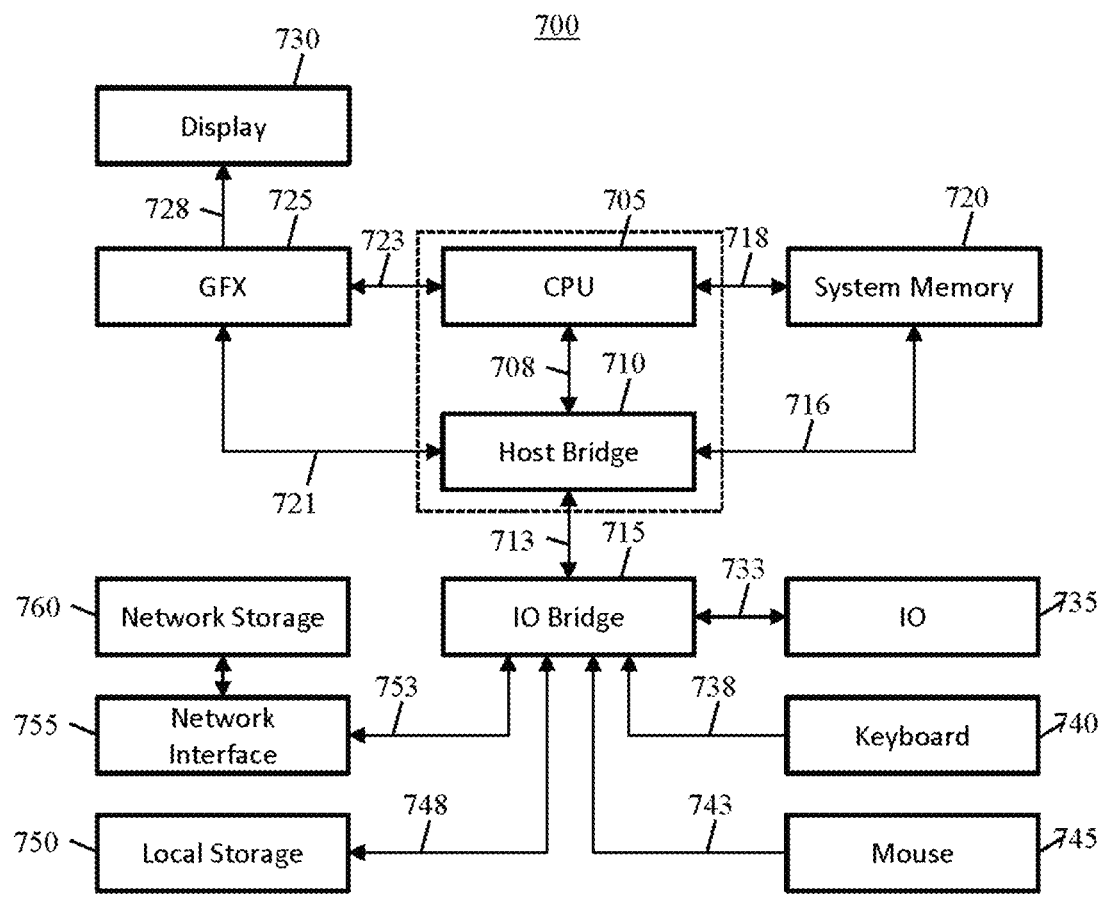
FIG. 10 is a schematic representation of a computer processing device that may be used to implement functions and processes, according to one or more examples of the present disclosure, according to one or more examples of the disclosure.

Turning now to FIG. 10, a schematic representation of a computer processing device 700 that may be used to implement functions and processes in accordance with one or more examples of the present disclosure is shown. FIG. 10 illustrates a computer processing device 700 that may be used to implement the systems, methods, and processes of this disclosure. For example, computing device 700 illustrated in FIG. 10 could represent a client device or a physical server device and include either hardware or virtual processor(s) depending on the level of abstraction of the computing device. In some instances (without abstraction), computing device 700 and its elements, as shown in FIG. 10, each relate to physical hardware. Alternatively, in some instances one, more, or all of the elements could be implemented using emulators or virtual machines as levels of abstraction. In any case, no matter how many levels of abstraction away from the physical hardware, computing device 700 at its lowest level may be implemented on physical hardware. In one implementation, computing device 700 may allow a subscriber to remotely access one or more data centers. Similarly, the management tool used by the subscriber may include a software solution that runs on such a computing device 700.

FIG. 10 shows a computing system 700 in accordance with one or more examples of the present disclosure. Computing system 700 may be used to implement aspects of the present disclosure, such as an orchestrator, a gateway manager, a cloud monitor, a local storage, a cloud-based storage, or any other device that may be used implementing the systems and methods for managing data discussed herein. Computing system 700 may include one or more central processing units (singular "CPU" or plural "CPUs") 705 disposed on one or more printed circuit boards (not otherwise shown). Each of the one or more CPUs 705 may be a single-core processor (not independently illustrated) or a multi-core processor (not independently illustrated). Multi-core processors typically include a plurality of processor cores (not shown) disposed on the same physical die (not shown) or a plurality of processor cores (not shown) disposed on multiple die (not shown) that are collectively disposed within the same mechanical package (not shown). Computing system 700 may include one or more core logic devices such as, for example, host bridge 710 and input/output ("IO") bridge 715.

CPU 705 may include an interface 708 to host bridge 710, an interface 718 to system memory 720, and an interface 723 to one or more IO devices, such as, for example, graphics processing unit ("GFX") 725. GFX 725 may include one or more graphics processor cores (not independently shown) and an interface 728 to display 730. In certain examples, CPU 705 may integrate the functionality of GFX 725 and interface directly (not shown) with display 730. Host bridge 710 may include an interface 708 to CPU 705, an interface 713 to IO bridge 715, for examples where CPU 705 does not include interface 718 to system memory 720, an interface 716 to system memory 720, and for examples where CPU 705 does not include integrated GFX 725 or interface 723 to GFX 725, an interface 721 to GFX 725. One of ordinary skill in the art will recognize that CPU 705 and host bridge 710 may be integrated, in whole or in part, to reduce chip count, motherboard footprint, thermal design power, and power consumption. IO bridge 715 may include an interface 713 to host bridge 710, one or more interfaces 733 to one or more IO expansion devices 735, an interface 738 to keyboard 740, an interface 743 to mouse 745, an interface 748 to one or more local storage devices 750, and an interface 753 to one or more network interface devices 755.

Each local storage device 750 may be a solid-state memory device, a solid-state memory device array, a hard disk drive, a hard disk drive array, or any other non-transitory computer readable medium. Each network interface device 755 may provide one or more network interfaces including, for example, Ethernet, Fibre Channel, WiMAX, Wi-Fi®, Bluetooth®, or any other network protocol suitable to facilitate networked communications. Computing system 700 may include one or more network-attached storage devices 760 in addition to, or instead of, one or more local storage devices 750. Network-attached storage device 760 may be a solid-state memory device, a solid-state memory device array, a hard disk drive, a hard disk drive array, or any other non-transitory computer readable medium. Network-attached storage device 760 may or may not be collocated with computing system 700 and may be accessible to computing system 700 via one or more network interfaces provided by one or more network interface devices 755.

One of ordinary skill in the art will recognize that computing system 700 may include one or more application specific integrated circuits ("ASICs") that are configured to perform a certain function, such as, for example, hashing (not shown), in a more efficient manner. The one or more ASICs may interface directly with an interface of CPU 705, host bridge 760, or IO bridge 715. Alternatively, an application-specific computing system (not shown), sometimes referred to as mining systems, may be reduced to only those components necessary to perform the desired function, such as hashing via one or more hashing ASICs, to reduce chip count, motherboard footprint, thermal design power, and power consumption. As such, one of ordinary skill in the art will recognize that the one or more CPUs 705, host bridge 710, IO bridge 715, or ASICs or various sub-sets, super-sets, or combinations of functions or features thereof, may be integrated, in whole or in part, or distributed among various devices in a way that may vary based on an application, design, or form factor in accordance with one or more example examples. As such, the description of computing system 700 is an example, and not intended to limit the type, kind, or configuration of components that constitute a computing system suitable for performing computing operations, including, but not limited to, hashing functions. Additionally, one of ordinary skill in the art will recognize that computing system 700, an application specific computing system (not shown), or combination thereof, may be disposed in a standalone, desktop, server, or rack mountable form factor.

One of ordinary skill in the art will recognize that computing system 700 may be a cloud-based server, a server, a workstation, a desktop, a laptop, a netbook, a tablet, a smartphone, a mobile device, and/or any other type of computing system in accordance with one or more example examples.

The foregoing description, for purposes of explanation, used specific nomenclature to provide a thorough understanding of the disclosure. However, it will be apparent to one skilled in the art that the specific details are not required in order to practice the systems and methods described herein. The foregoing descriptions of specific examples are presented for purposes of illustration and description. They are not intended to be exhaustive of or to limit this disclosure to the precise forms described. Obviously, many modifications and variations are possible in view of the above teachings. The examples are shown and described in order to best explain the principles of this disclosure and practical applications, to thereby enable others skilled in the art to best utilize this disclosure and various examples with various modifications as are suited to the particular use contemplated. It is intended that the scope of this disclosure be defined by the claims and their equivalents below.

What is claimed is:

1. A method for managing bandwidth, the method comprising:
    identifying a first tier of applications and a second tier of applications;
    determining a number of user sessions associated with at least one application among the first tier of applications and the second tier of applications, each user session consuming a percentage of bandwidth of at least one communication channel in a network;
    baselining a second tier application bandwidth use for each user session associated with the second tier of applications to determine a first interval and a second interval;
    calculating a second tier application usage score associated with the second tier of applications, the calculating including determining a percentage of bandwidth used by the second tier of applications in the first interval and determining a percentage of bandwidth used by the second tier of applications in the second interval;
    generating a user score based on the second tier application usage score and a percentage of use of the first tier of applications; and
    adjusting a bandwidth allocation based on the user score.

2. The method of claim 1, wherein the baselining the second tier application bandwidth use further comprises determining a third interval.

3. The method of claim 1, wherein the calculating the second tier application usage score further comprises adjusting the percentage of bandwidth use by the second tier of applications in the first interval.

4. The method of claim 3, wherein the calculating the second tier application usage score further comprises adjusting the percentage of bandwidth use by the second tier of applications in the second interval.

5. The method of claim 1, wherein the generating the user score comprises weighting the user score based on the second tier application usage score and the percentage of use of the first tier of applications.

6. The method of claim 1, wherein the adjusting comprises limiting the user bandwidth.

7. The method of claim 1, further comprising repeating the identifying, the determining the baselining, the calculating and the generating based on a time period.

8. The method of claim 1, wherein the adjusting comprises limiting the second tier application bandwidth use to be equal to or less than the user score.

9. The method of claim 1, wherein the adjusting comprises limiting the second tier application bandwidth use to a linearly adjustable value based on the user score.

10. The method of claim 1, wherein the adjusting comprises taking no action if the user score is more than a threshold value.

11. The method of claim 1, wherein the identifying is based on at least one of a user count, a number of bytes, a number of packets, a category, a reputation, a device type, a device address, a network name, and a user role.

12. A non-transitory computer readable medium comprising computer executable instructions stored thereon that, when executed by a processor in a source system, cause the processor to:
    identify the application tier and a second application tier;
    determine a number of user sessions, each user session associated with at least one application in an application tier, each user session consuming a percentage of bandwidth of at least one communication channel in a network;
    baseline an application tier bandwidth use for each user session to determine a first interval and a second interval;
    calculate an application tier usage score;
    generate a user score based on the application tier usage score and the percentage of use of applications in second application tier; and
    adjust a bandwidth allocation based on the user score.

13. The non-transitory machine-readable storage medium of claim 12, wherein the first interval is less than the second interval.

14. The non-transitory machine-readable storage medium of claim 12, further comprising repeating the instructions to determine, baseline, and adjust based on a time period.

15. The non-transitory machine-readable storage medium of claim 12, wherein the instructions that cause the processor to identify, identify based on at least one of a user count, a number of bytes, a number of packets, a category, a reputation, a device type, a device address, a network name, and a user role.

16. A system comprising for managing bandwidth, the system comprising:
    a computing device having a processor and a non-transitory computer readable memory comprising computer executable instructions stored thereon that, when executed by the processor, cause the system to;
    identify a set of first tier applications and a set of second tier applications;

determine a number of user sessions associated with at least one application among the first tier of applications and the second tier of applications, each user session consuming a percentage of bandwidth of at least one communication channel in a network;

baseline a second tier application bandwidth use for each user session associated with the second tier of applications to determine a first interval and a second interval;

calculate a second tier application usage score associated with the second tier of applications, the calculating including determining a percentage of bandwidth used by the second tier of applications in the first interval and determining a percentage of bandwidth used by the second tier of applications in the second interval;

generate a user score based on a percentage of use of the set of first tier applications and a percentage of bandwidth used by the set of second tier applications; and apply a bandwidth contract for the set of second tier applications based on the user score.

17. The system of claim 16, wherein the non-transitory computer readable memory comprising computer executable instructions, when executed by the processor, cause the system to define the first interval and the second interval for the set of second tier applications.

18. The system of claim 16, wherein the non-transitory computer readable memory comprising computer executable instructions, when executed by the processor, cause the system to limit the bandwidth for second tier application use to be equal to or less than the user score.

* * * * *